Aug. 14, 1923.
J. P. TARBOX
1,464,784
BALANCING SYSTEM FOR AIRCRAFT
Original Filed June 20, 1918  2 Sheets-Sheet 1
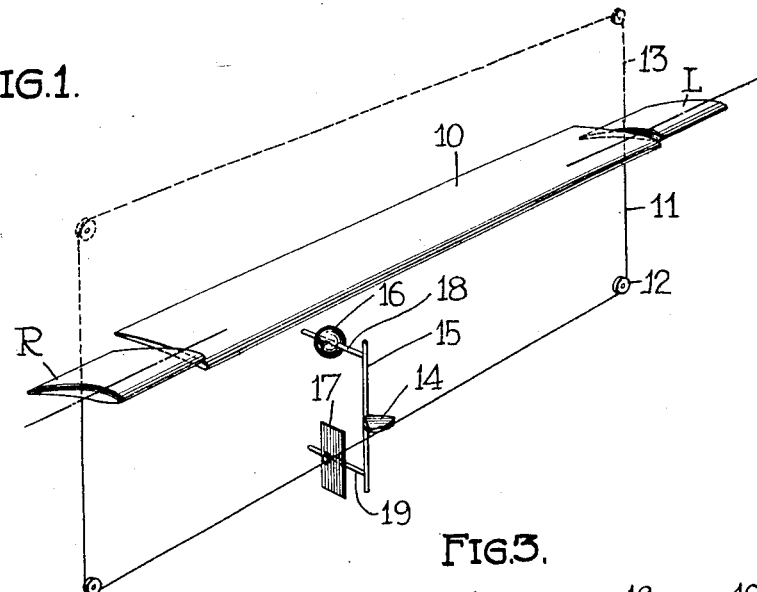
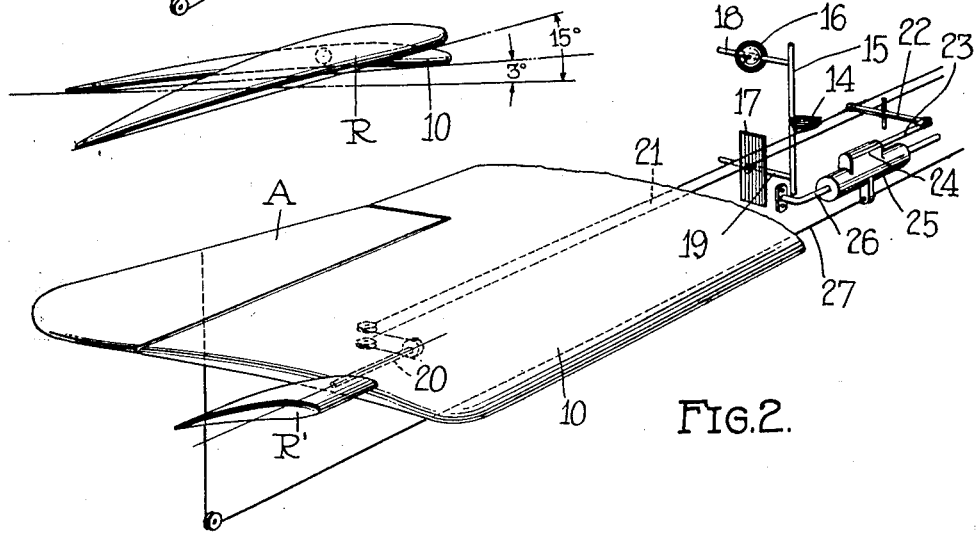
Inventor
By J. P. Tarbox

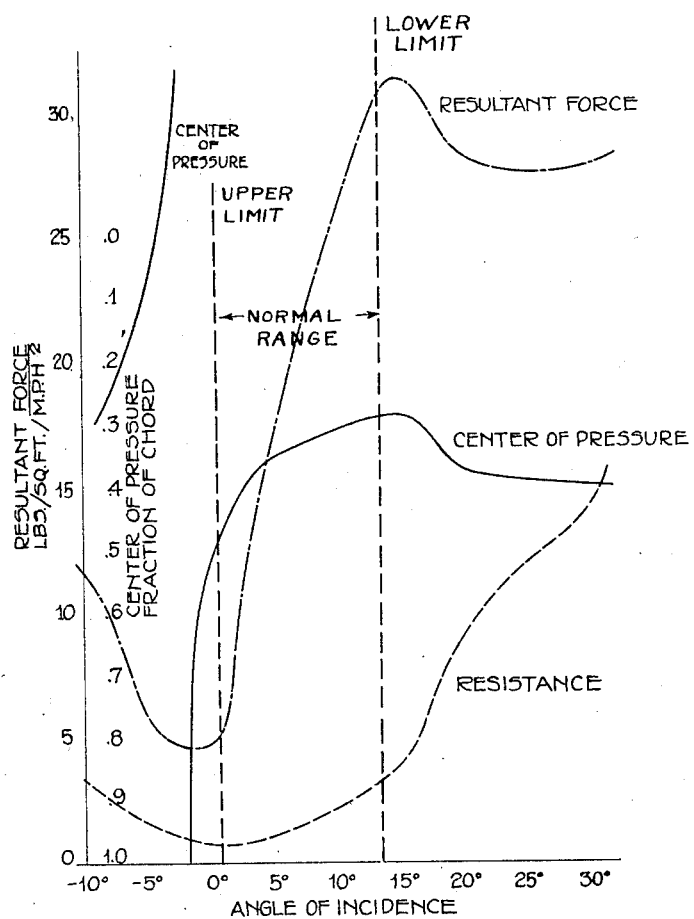

Patented Aug. 14, 1923.

1,464,784

UNITED STATES PATENT OFFICE.

JOHN P. TARBOX, OF GARDEN CITY, NEW YORK, ASSIGNOR TO TARBOX SAFETY AIRCRAFT COMPANY, A CORPORATION OF DELAWARE.

BALANCING SYSTEM FOR AIRCRAFT.

Application filed June 20, 1918, Serial No. 240,982. Renewed January 12, 1923.

*To all whom it may concern:*

Be it known that I, JOHN P. TARBOX, a citizen of the United States, residing at Garden City, in the county of Nassau and State of New York, have invented certain new and useful Improvements in Balancing Systems for Aircraft, of which the following is a specification.

My invention relates to balance systems for aircraft and particularly to lateral balance systems of the type disclosed in my issued Patent No. 1,239,636 in which the differentiation of the pressures of air rush on opposite sides of the craft combined with the force of gravity is utilized to effect control of the lateral balance. While having this special relation however it will be immediately obvious to those skilled in the art and having an understanding of the present invention that it is not only applicable to the particular systems with which it has been associated, but also may very readily be utilized in connection with other systems of longitudinal and lateral control.

In my application aforesaid, there were disclosed a pair of vertical axis ailerons connected together as by a cable to partake of differential movements in response to differences of pressures of air rush acting upon them, having masses so disposed as to apply the force of gravity to bias the system to a balance restoring attitude when the craft was moved to, and as long as it remained in, an abnormal attitude. Both the apparatus and the method disclosed have been found to operate successfully through experiments made first upon a whirling arm and subsequently in a wind tunnel.

My present invention is an improvement directed particularly to a system embodying ailerons of the transverse axis type. The improvement, however, is also applicable to systems embodied by ailerons of other types, including the vertical axis type. When ailerons of the transverse axis type are connected together for differential action as above set forth, I have found that they have when set at extremely low angles of incidence a tendency to permit the inducement of oscillatory or pumping action. Careful adjustment, or the provision of auxiliary damping surfaces or vanes as provided for in my earlier systems, will each prevent this, but I have found that the necessity of close adjustment and the careful proportioning of damping surfaces can be absolutely eliminated by giving the ailerons a normal setting and angle of incidence in excess of that indicated by the maximum efficiency of the aileron section employed. A principal aim of the system of my invention is that the aileron control surfaces shall in addition to the balancing function, lift useful load. The most obvious way to accomplish this is to give the surfaces a normal setting for horizontal flight of the craft in accordance with the well recognized practice, choosing an angle in the neighborhood of the angle of maximum efficiency which, if the aileron is of a section the same as or similar to the section of the main supporting surfaces, is usually a very small angle. According to my invention I make this angle different, preferably considerably greater and find that the beneficial effects are realized in the greater degree as the angle of setting approaches the critical angle. I also make the aerofoil section different. The aerodynamic reason for this phenomena is found to be twofold. First in balancing systems of the type set forth, there are equated moments of resistance. At extremely low angles the resistance increases on both sides of said minimum angle. Obviously this brings about moments nonconformable and incommensurate to the unbalancing forces. Secondly at a low angle in the vicinity of the angle of minimum resistance, there is a substantial, sudden and extensive travel of the center of pressure. Such travel changes immensely the lever arm of the moments of both resistance and lift (and correspondingly of the resulting total force). These irregularities induce oscillations. Now by giving the balancing surfaces comparatively large positive angles in their normal range of movement they do not reach at their upper extreme or at their minimum angle, the angles of minimum resistance or angles of substantial and sudden changes in center of pressure. Throughout the normal range of movement, therefore, the action is stabilized.

Incidentally a secondary advantage of considerable importance is also attained by this device. The end losses by way of the tips of the wings are materially reduced and efficiency of the aeroplane greatly increased thereby.

Referring to the drawing, Fig. 1 is a perspective diagrammatic showing of one embodiment of my invention, Fig. 2 a similar view of another, Fig. 3 a diagram illustrating the relation of the ailerons to the main supporting surfaces, Fig. 4 is a set of characteristic curves of the modern aerofoil.

Referring first to Fig. 1, 10 is the main supporting surface and R and L the right and left hand ailerons or balancing surfaces. As illustrated they are of the transverse axis type the axis being designated by the dash and dot lines passing near the leading edges. This axis may be constituted by any form of shaft or any form of bearing in the proper transverse relation to the ailerons R and L and having suitable support from the main supporting surface 10, or from any structure associated therewith and constituting a relatively fixed body as respects surfaces R and L. By reason of location near the leading edge of the surface, the axes are in advance of the point of extreme forward movement of the center of pressure in normal travel. A cable 11 interconnects the surfaces at the rear of the axes, being guided over suitable pulleys 12. A second cable 13, may be arranged as shown in dotted lines if desired to retain the ailerons in normal position against the action of gravity while the aeroplane is standing. Connected with cable 11, by sector 14, in this case on a substantially vertically disposed axis 15 are a mass 16 and a damping vane 17 adjustably mounted on arms 18 and 19 respectively carried by said axis 15. The axis 15 is to be supported from any fixed part of the machine, or from any part fixed relative to surfaces R and L or the interconnecting cable 11 (or cable 13) with which parts 14, 16, 17 may be combined.

The ailerons R and L are as shown in Fig. 3, given a normal angle of incidence in excess of the normal angle of incidence of the main supporting surface 10. As indicated in Fig. 3 the principal supporting surface is set at 3° but the balancing surfaces R and L are set normally at 15°. The aerofoil section of the surfaces R and L may be in a given instance the same as that of the principal supporting surface 10, but I have illustrated them as of different section, and they should be of that section operating most efficiently from all standpoints (particularly that of minimum head resistance) at the larger angles of which they are set. Thus we will assume that the section of surface R shown in Fig. 3 operates at 15° at considerably greater efficiency than would a similarly disposed section of the main surface 10. Surface 10 we will assume operates most efficiently at an angle in the neighborhood of 3°.

This normal setting is maintained by cable 11 (or 11 and 13). The plane of vane 17 is parallel to the line of flight and this vane is exposed to the air rush. Axis 15, sector 14 and mass 16 however may be and preferably are housed within some one of the stream lined fuselages or nacelles associated with the machine, in order that they may not add to the drag.

In operation the varying pressures acting upon the opposite sides of the machine act also upon the balancing surfaces R and L and they in turn partake of differential movement by reason of interconnecting cable 11, the mass 16 and the vane 17 moving in unison (or in synchronism) therewith. The sector 14 is of course appropriately curved and the sections of cable 11 so connected therewith that the leverage afforded by the sector is maintained the same. In action as thus organized I find the system to be completely positive and dead-beat, and yet, there is no change so small or so subtle that it escapes prompt detection and correction. In other words the action is at once sensitive, positive and steady.

Referring now to the diagrams of Fig. 4, the relation of the differential self acting surfaces R and L to the line of flight and the relation of the normal range of operative movement to the angles of minimum resistance and substantial change of the center of pressure clearly appears. The normal range is indicated by dotted lines. It will be seen that the upper or small angle limit of this range lies on that side of the angles of minimum resistance and substantial change in center of pressure toward the critical angle. The lower range may lie on either side of the critical angle, although it should preferably not very greatly exceed it. I have found the position of the lower limit to be relatively immaterial within reasonable range of the critical angle. In actual tests made, suitable stops were provided to regulate the range of movement between desirable limits.

The dimensions, contours, sections and interconnections of the parts may be varied to suit the particular machine upon which the system is installed. Adjustments to secure any degree of sensitivity, positiveness and steadiness may likewise be made. The action of the adjustable mass 16 and vane 17 is identical with that disclosed in my issued Patent No. 1,239,636. The fact that these elements are located at an intermediate point instead of at the extremities of the machine does not change the fundamental functioning.

The form of Fig. 2 differs from the form of Fig. 1 in that surfaces R' (and L' not shown) are made very small in size and constituted mere pilot surfaces. As indicated they are mounted upon small stub shafts 20 journaled on the ends of main supporting surface 10 and are interconnected by cables 21 for differential movement similar to the surfaces R and L. The relative normal setting as respects the main supporting surface 10 is the same, that is, their normal angle of incidence is greater. Cables 21 are connected to elements 14, 15, 16, 17 similar to those of Fig. 1. In addition, however, cables 21 are connected by lever 22 with the stem of the control valve (or equivalent controlling element) of a fluid operated (or other) servo motor 25. The motor illustrated is of the fixed piston type as indicated by the fixed piston rod 26, the body 25 moving on the rod 26. This type is well known to the art and its remaining details need not be shown. The movable body 25 is connected by the usual operating cables 27 to the usual balancing ailerons A at the trailing edge of the main supporting surface 10.

The operation is essentially similar to the operation of the system disclosed in Fig. 1. Instead however of exercising controlling forces of such size as to themselves effect balance of the machine, these pilot surfaces (R' and L') act upon the control member 24 of the servo motor 25 to effect balance of the machine through the movements of the ordinary aileron A in such direction and to such extent as necessary for correction of balance.

There are yet other embodiments of which my invention is capable, many others. All such embodiments should fall within the scope of the appended claims.

1. In an aircraft, a lateral balancing system, comprising differential self acting laterally disposed supplemental surfaces having each a positive normal range of angular movement so fixed in position and extent with respect to the line of flight that both upper and lower extremes of normal movement lie on that side of its angle of center of pressure reversal toward its own critical angle.

2. In an aircraft having a principal supporting surface having a determinate normal angle of incidence with respect to the line of flight, together with differential self acting relatively movable lateral balance control surfaces, having normally each an angle of incidence with respect to its own regional air rush numerically greater than the angle of incidence of said principal supporting surface aforesaid, together with air rush actuated damping means affecting the differential movement of said surfaces.

3. An aircraft comprising a main supporting member which constitutes the lifting body of the craft, and an automatic balancing system therefor comprising balancing devices upon each side of said main supporting member and presenting co-operating transversely extended surfaces arranged to be acted upon normally during flight by air pressure to produce torques in opposite directions about the longitudinal axis of the craft, said balancing devices being connected to each other and each responsive to temporarily preponderating pressure thereon to increase the torque of the other, and having associated therewith a mass acted upon by gravity when the craft is unbalanced to alter the normal torque relations as long as the craft remains unbalanced, said main supporting member having a determinate normal angle of incidence with respect to the line of flight while said balancing devices have normally angles of incidence each with respect to its own regional air rush numerically greater than the angle of incidence of said supporting member aforesaid and damping means affecting the movements of said balance devices.

4. In an aircraft having a principal supporting surface having a determinate normal angle of incidence, together with differential self acting relatively movable lateral balance control surfaces, having a positive normal setting of the angle of incidence materially greater than the normal angle of said supporting surfaces, said lateral balance control surfaces having a longitudinal aerofoil section whose lift over drift ratio at the greater normal angle of incidence of said control surfaces is greater than the lift over drift ratio which can be derived from the adjacent section of the principal supporting surface at the same greater angle of incidence.

5. In an aircraft having a principal supporting surface having a determinate normal angle of incidence with respect to the line of flight, together with differential self acting relatively movable lateral balance control surfaces having normal angular range of movement of such extent and so fixed with respect to the line of flight that at its upper extreme the surface is at a positive angle adjacent to but toward the critical angle from the angle of marked change in position of the center of pressure.

6. In an aircraft having a principal supporting surface having a determinate normal angle of incidence, differential self acting relatively movable lateral balance control surfaces having a relatively large normal range of change of the angle of incidence in their normal balancing function, which range is of such extent and so fixed with respect to the line of flight that its upper extremity gives to the surface an angle lying on that side of the angle marking minimum resistance which is towards the critical angle.

7. In an aircraft having a principal supporting surface having a determinate normal angle of incidence with respect to the line of flight, a self acting balancing system therefor comprising differentially connected relatively movable lateral balance control surfaces relatively movable about transverse axes, which differentially connected surfaces have a normal range of movement so fixed in position and extent with respect to the line of flight that at the uppermost limit of normal movement neither balance surface is at the angle of substantial travel of the center of pressure, but at an angle on that side of said angle of substantial travel of the center of pressure lying toward the critical angle.

In testimony whereof I hereunto affix my signature.

JOHN P. TARBOX.